United States Patent [19]

Carossino

[11] Patent Number: 4,915,367

[45] Date of Patent: Apr. 10, 1990

[54] CLAMPING APPARATUS FOR PARTS TO BE MACHINED

[75] Inventor: Andre Carossino, Louveciennes, France

[73] Assignee: Carossino Freres, Saint-Ouen-l'Aumone, France

[21] Appl. No.: 244,693

[22] Filed: Sep. 14, 1988

[30] Foreign Application Priority Data

Sep. 15, 1987 [FR] France ................................ 87 12756

[51] Int. Cl.[4] ................................................ B23Q 3/02

[52] U.S. Cl. .................................... 269/101; 269/235; 269/254 R; 269/257

[58] Field of Search ...................... 254/91, 93, 99, 100, 254/101, 231, 232, 233, 235, 254 R, 257

[56] References Cited

U.S. PATENT DOCUMENTS

| | | | |
|---|---|---|---|
| 449,039 | 3/1891 | Fietsch | 269/235 |
| 2,477,297 | 7/1949 | Giles et al. | 269/134 |
| 2,969,817 | 1/1961 | Zabich | 269/101 |
| 4,157,819 | 6/1979 | Meyer | 269/900 |
| 4,489,927 | 12/1984 | Yamada et al. | 269/137 |

FOREIGN PATENT DOCUMENTS

| | | | |
|---|---|---|---|
| 2224247 | 6/1973 | France | 269/134 |

*Primary Examiner*—Robert C. Watson
*Attorney, Agent, or Firm*—Andrus, Sceales, Starke & Sawall

[57] ABSTRACT

The embodiments of the invention described relate to clamping apparatus for parts to be machined comprising cramps presenting elastically deformable fingers which engage the flanks of the part to be machined and rigid fingers which abut the part, a T-grooved bed-plate, sliders bearing the cramps, and locking braces for locking the sliders on the bed-plate. Eccentrics enable the cramps to be advanced on the slider to bend the deformable fingers and bring the rigid fingers into abutment with the part. The opposite cramps are secured to the bed-plate in alignment with a reference face perpendicular to the grooves. Lateral grooves are provided for engagement by clamps to fix the bed-plate to a table of a machine tool. Cramps are provided in recesses under the sides of the bed-plate for alternative engagement by the jaws of a vice. Variants are described, which enable parts with non-parallel sides to be clamped. The clamping apparatus is particularly suitable for repetitive use (mass production).

21 Claims, 10 Drawing Sheets

CLAMPING APPARATUS FOR PARTS TO BE MACHINED

BACKGROUND OF THE INVENTION

This invention relates to clamping apparatus for clamping parts to be machined to a work station, which may be the jaws of a vice or the table of a machine-tool as desired, especially for use in repetitive production.

DESCRIPTION OF THE PRIOR ART

Clamping apparatus for a machine-tool is known for securing a part to be machined facing a tool, which may be a bit, a mill, a plane tool or the like. A known apparatus of this kind (French patent No. 2 427 170 of the present applicant) comprises clamping members of spring steel in the form of cramps each comprising three fingers, two of which are relatively thin and are elastically deformable while the third is thicker and set back from the others to form an abutment. Engagement of the cramps against the side face of a part to be machined is produced by a horizontal thrust exerted by displacement of a bolt. This device is effective as a clamp but presents major disadvantages in that it is large and ill-suited to multiple clamping of parts to be machined on an available surface.

Another clamping apparatus is known (DE 3 237 705 of 12 Oct. 1982) comprising a bed-plate whose upper surface presents T-section grooves in which slide clamp members comprising jaws mounted to move obliquely towards the flank of the part to be machined under the action of a claim screw. The effectiveness of such a clamp system is unpredictable, since the clamp pressures of the jaws on the flanks of the part to be machined are very much a function of the degree of tightening of the bolt and consequently of the reliability of the operator. Accidents due to unclamping of the part being machined are serious as the part may be thrown of like a projectile. Moreover, the oblique movement of the jaw causes progressive friction of its working face with the flank of the part to be machined and risk therefore to cause damage or deterioration to the part.

OBJECTS OF THE INVENTION

An object of the invention is to avoid some or all of the above disadvantages.

An another object of the invention is to provide clamping apparatus suitable for repetitive production.

Yet another object of the invention is to provide clamping apparatus which clamps the part to be machined readily, quickly and reliably, while leaving the top surface of the part free to be machined.

Still another object of the invention is to provide clamping apparatus which avoids or minimizes damage to the clamped part.

DESCRIPTION OF THE INVENTION

The present invention provides a clamping apparatus for clamping a part to be machined to a work station, comprising a bed plate presenting a working surface, and parallel grooves of generally T-section in said working surface and at least one slider for cooperating with said grooves, said slider comprising a slider body including locking means for locking said slider body on said bed plate, wherein said slider includes a cramp presenting at least one elastically deformable finger, said cramp being mounted displaceably on said body, and eccentric means for displacing said cramp into engagement with a first side of the part to be machined, the apparatus also including at least one abutment for fixing relative to said bed plate, said abutment comprising at least one cramp presenting at least one elastically deformable finger for engaging a second side of the part to be machined opposite to said first side, whereby to clamp said part between said cramps on said bed-plate, and fixing means for securing said bed-plate to said work station.

In a preferred embodiment of the invention, said slider body comprises a first part of generally inverted-T-section complementary to said grooves of said bed-plate for sliding in one of said grooves said locking means including a second part of generally T-section for extending above said groove, and screw means for urging said first and second parts together whereby to lock said slider body relative to said bed-plate, and said cramp being mounted on said first part of said slider body by said eccentric means which includes a shaft and a head mounted eccentrically on said shaft.

In another preferred embodiment of the invention, said fingers of said cramp of said abutment present engagement faces for engaging the part to be machined, said faces being parallel to a reference plane which is defined by a side face of said bed-plate, said abutment comprising two locating bolts for engaging tapped holes in said bed-plate , whereby to secure said abutment to said bed-plate, the line joining the longitudinal axes of said locating bolts being parallel to said reference plane and to said engagement faces, whereby to ensure accuracy of the parallelism.

In yet another embodiment of the invention, said fixing means comprise at least one further cramp disposed in a recess presented by said bed-plate in a bearing face thereof, and a fixing bolt presenting a head, said further cramp presenting an annular shoulder for cooperating with said head, said bed-plate presenting a tapped hole in said recess for receiving said fixing bolt, whereby to secure said further cramp in said recess.

DESCRIPTION OF THE DRAWINGS

Other features and advantages of the invention will appear from the following description of embodiments thereof, given by way of example with reference to the accompanying drawings in which.

DESCRIPTION OF THE PREFERRED EMBODIMENTS OF THE INVENTION

Figure 1:
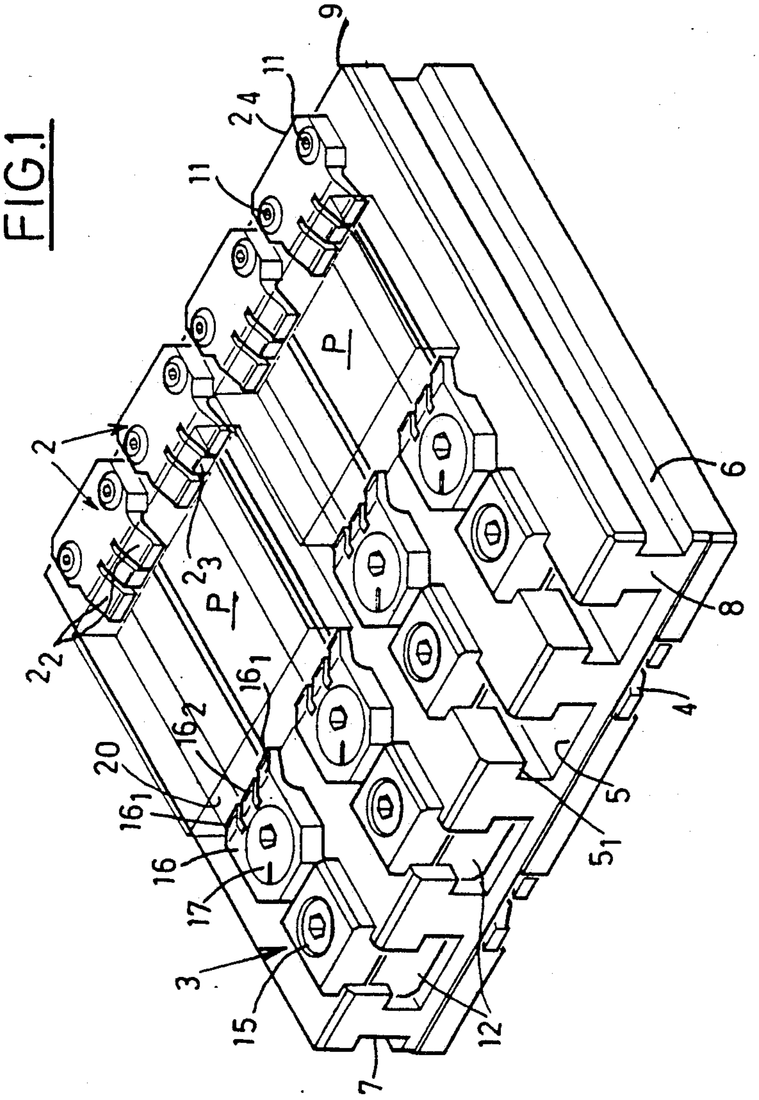
FIG. 1 is a perspective view of a clamping apparatus in accordance with the invention comprising a bed-plate onto which parts are to be secured for machining in repetitive production.

The clamping apparatus illustrated in the drawings comprises four main features: a bed-plate 1, abutment-cramps 2, locking sliders 3, and means 4 for fixing the bed-plate onto the table of a machine-tool or into the jaws of a vice or press.

Figure 3:
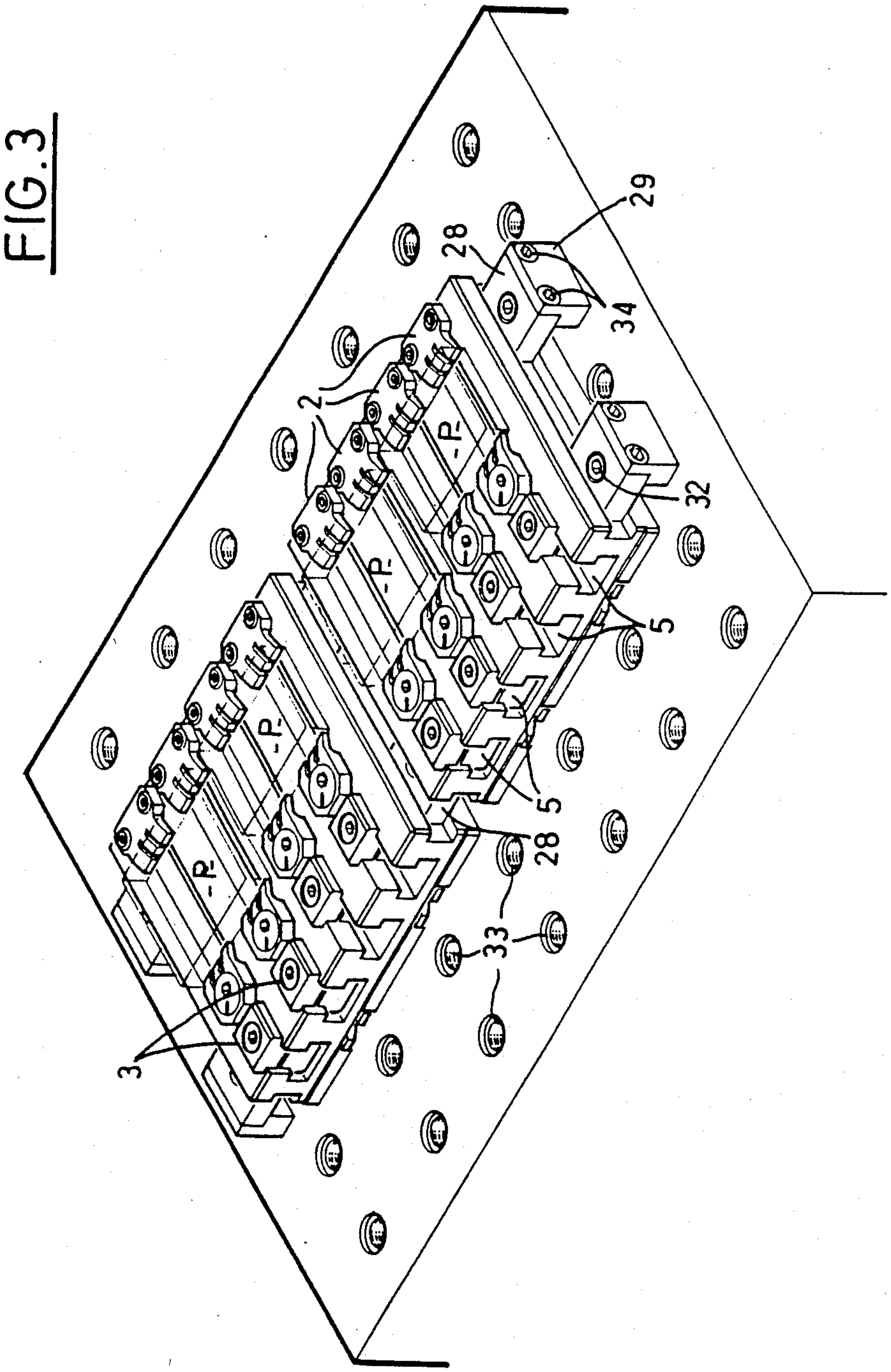
FIG. 3 is a perspective view illustrating the fixing of two such bed-plates on the same top of a table of a machine-tool.
Figure 4:
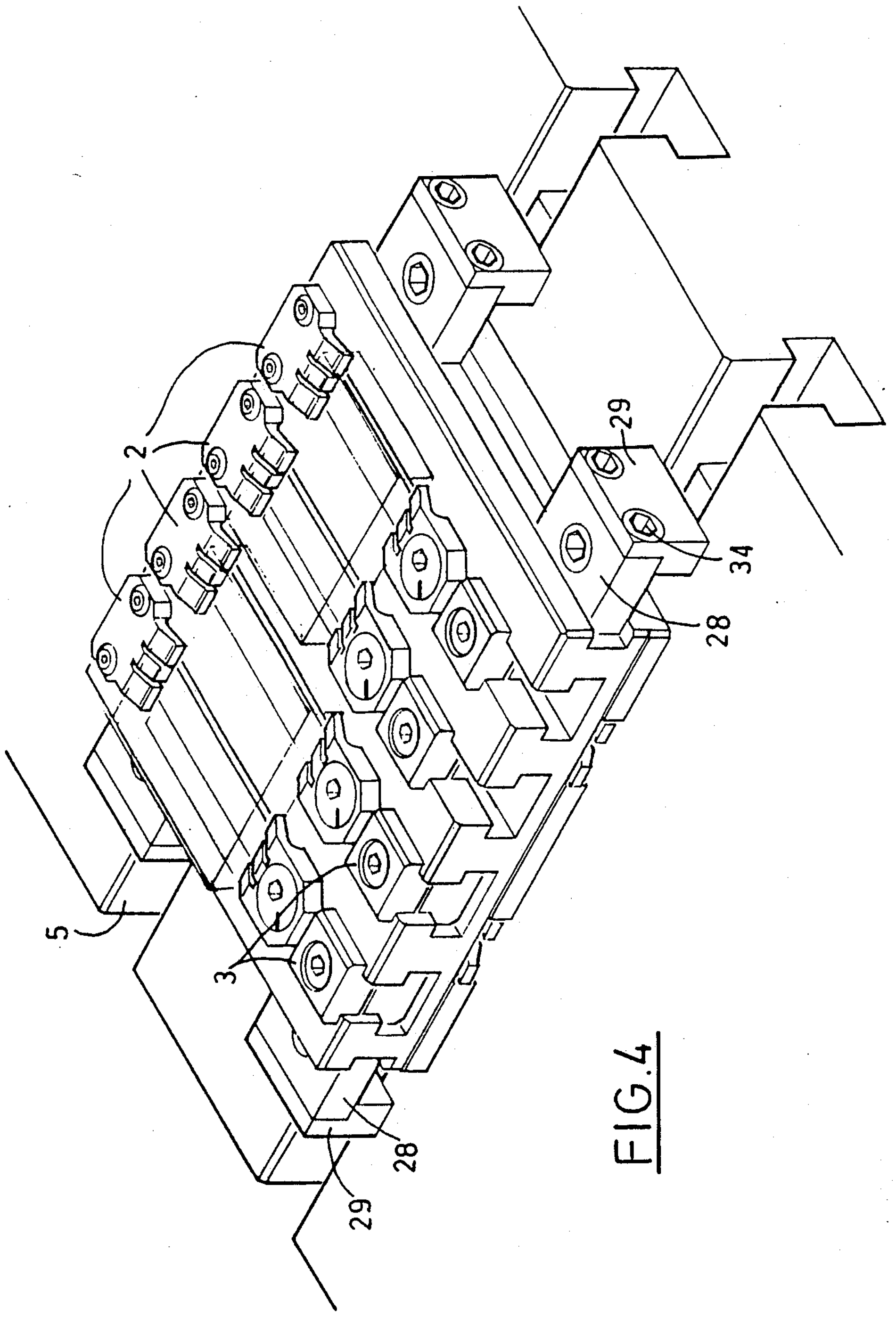
FIG. 4 is a perspective view of a bed-plate fixed into T-section grooves in a machine-tool table.

In more detail, the bed-plate 1 has the form of a parallelepiped block provided with parallel grooves 5 of T-section whose dimensions are comparable to those of the grooves of a machine-tool table. The two opposed sides of the bed-plate, parallel to the grooves, present rectilinear grooves 6 and 7 which are to be used to fix the bed-plate onto the table of a machine-tool as shown in FIGS. 3 and 4, for example.

The other two sides 8 and 9 of the bed-plate are strictly perpendicular to the grooved sides, so as to present reference planes, particularly for the abutment-cramps 2.

The abutment-cramps 2 and the sliders 3 used for clamping the parts P to be machined will now be described in more detail.

Figure 6:
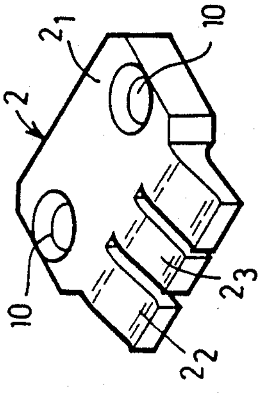
FIG. 6 is a perspective view of an abutment cramp.
Figure 11:
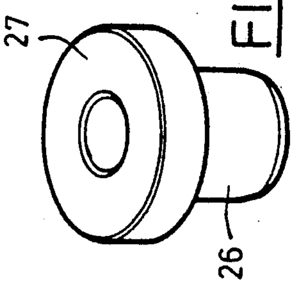
FIG. 11 is a perspective view of the spacer of FIG. 10.

The abutment-cramps are shown in FIG. 1 and appear with more detail in FIG. 6. Each of the abutment cramps 2 comprises a cramp-piece $2_1$ provided with two holes 10 for the passage of bolts, and presenting three fingers $2_2$,$2_3$ extending on one of its longitudinal sides, two of the fingers $2_2$ being elastically deformable, while the third finger $2_3$ is relatively rigid to form a deflection-limiting abutment. The deformable fingers $2_2$ are situated on each side of the rigid finger $2_3$ which is thicker than the other two and is set slightly further back, so that it bears laterally against the part P to be machined after elastic deformation (arching) of the outer fingers $2_2$. The abutment cramps 2 are secured onto the upper face of the bed-plate 1 by threaded teat-screws 11 (FIG. 1) also known in the art as "locating-bolts", the front edges of the cramps being aligned relative to the side 9 of the bed-plate which thus constitutes a reference plane, the precise alignment of the front edges of the cramp relative to this plane being ensured by the combination of exact parallelism between this plane and the line passing through the respective longitudinal axes of the two fixing bolts 11 and rigorous parallelism between this line and the front edges of the cramp, so that the clamp force will be applied with uniform distribution between the two front edges of the cramp and by reaction on the two bolts 11 holding the cramp.

Figure 5:
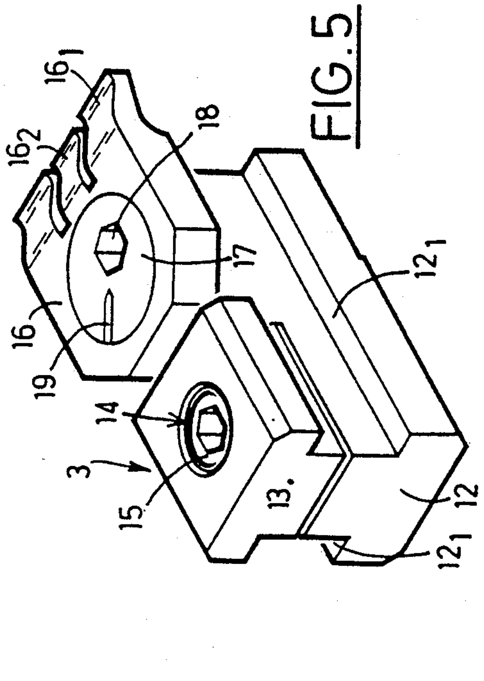
FIG. 5 is a perspective view of a locking slider.

Each of the sliders 3 shown in FIG. 1 and appearing in more detail in FIG. 5 comprises a base 12 whose section is inverted T-shape of dimensions complementary to those of the grooves 5 in the bed-plate 1. The base 12 supports a brace 13 also of T-section, pierced through by a circular passage 14 which accommodates a fixing bolt 15 whose lower end is screwed into the base 12. The slider 3 also comprises a locking cramp 16 similar to the abutment cramp 2, that is to say having three fingers, the two outer fingers 161 being thinner and therefore elastically deformable whereas the middle finger 162 is thicker and set back slightly. Moreover, and this is an important feature of this embodiment of the invention, the cramp 16 is provided with an annular shoulder which cooperates with an eccentric head 17 on a shaft 18 which extends down through the base 12 and is secured against translation movement by a circlip (not shown). Thus, rotation of the shaft, by an Allen key introduced into a hexagonal recess 18 in the head, enables the cramp 16 to be displaced forwards and backwards, that is to say towards and away from the part P as shown in FIG. 1. The adjustment stroke is indicated by a mark 19 on the eccentric head of the shaft. As the shaft 18 rotates to move the clamp forwards, the cramp 16 exerts a thrust on the part P against the abutment cramps 2, fixed in position and aligned at the edge of the bed-plate. Consequently, it is the rotation of the eccentric head 19 which ensures the clamping of the part P to be machined, the elastically deformable fingers 161 entering into contact first with the flank of the part P to be machined (FIG. 7) until, after elastic deformation, the middle finger 162 in turn contacts the part P.

Figure 7:
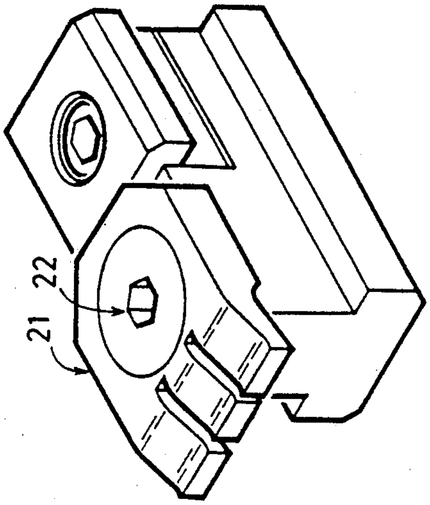
FIG. 7 is a perspective view of a slider whose cramp is adjustable angularly to fit parts with non parallel sides.

If the part to be machined does not have rigorously parallel flanks, another type of slider can be used instead, such as that shown in FIG. 7, and substituted for the abutment cramp 2. In this case, a cramp 21 provided on the slider is angularly adjustable about an axis 22, similar otherwise to the slider 3 of FIG. 5; except that the axis 22 has no eccentric. Thus, the cramp can pivot to position itself angularly to accommodate inclination of the flank of the part to be machined and can be locked in this position. In this case, the slider shown in FIG. 7 will work in opposition to the slider illustrated in FIG. 5.

Figure 25:
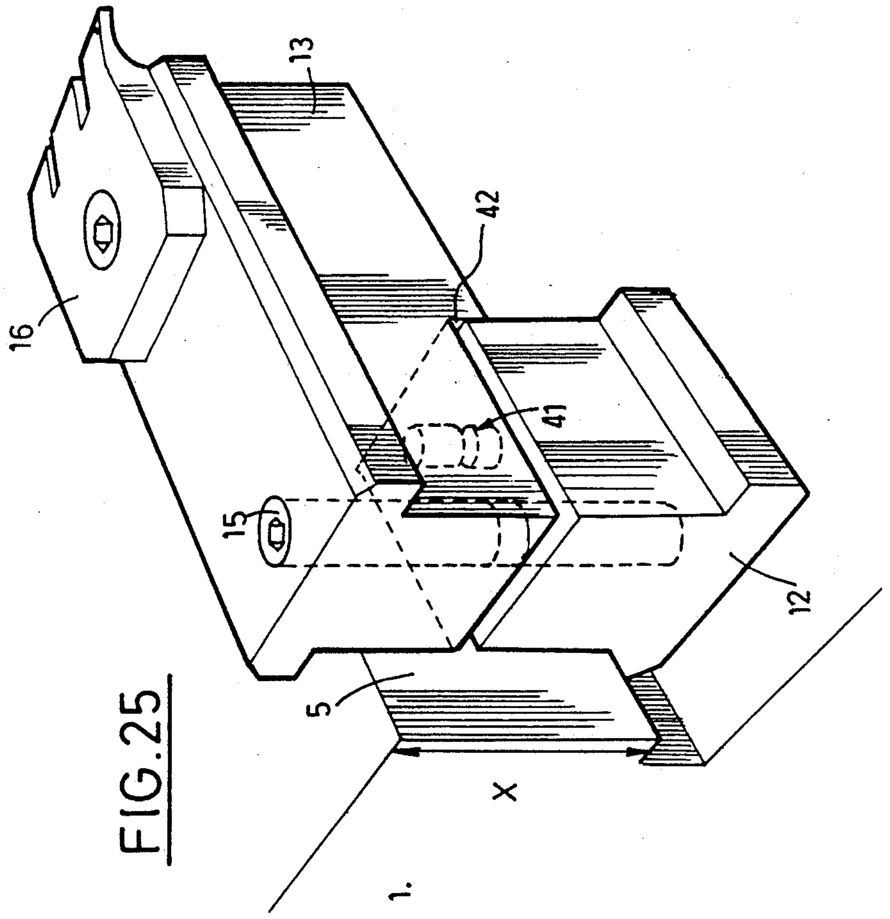
FIG. 25 is an exploded perspective view of a slider comprising a raised spacer.

The T-grooves 5 of the bed-plate 1 meet the usual standards. The depth of the T-groove 5 can present variations of dimensioning of several millimeters according to the standards applied to grooves of machine-tools tables, ISO 229 or DIN 650. If necessary, sliders of the kind with spacers, which are unaffected by these differences in depth dimensions may be used. One such slider is shown in FIG. 25 , the variable depth of the groove being indicated at "X". The raised slider shown in FIG. 25 comprises a base 12 of inverted T-section sliding in the groove 5, and having dimensions complementary to those of the groove 5. The base 12 supports a brace 13, also of T-section, the brace 13 being secured to the base 12 by means of a fixing bolt 15 and a locating peg 41 accommodated partly in the base 12 and partly in the brace 13. The axis of the fixing bolt 15 and the axis of the locating peg are disposed in the alignment of the longitudinal axis of the base 12. The brace 13 has an end projecting longitudinally from the base 12. A cramp 16 is secured at this end projecting from the brace 13, so that the cramp 16 overhangs the base 12. The cramp 16 may be of the kind cooperating with an eccentric as shown in FIG. 5 or non eccentric as shown in FIG. 7. Thus, with this design, variations of the depth of the T-groove may readily be compensated by adjusting the positioning of the brace 13 relative to the base 12 using the fixing bolt 15.

Figure 9:
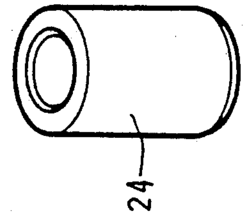
FIG. 9 is a perspective view of the sleeve of FIG. 8.
Figure 10:
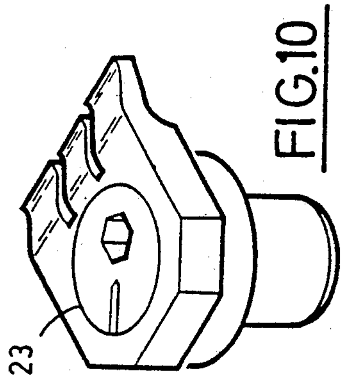
FIG. 10 is a perspective view of a locking cramp associated with a spacer.
Figure 23:
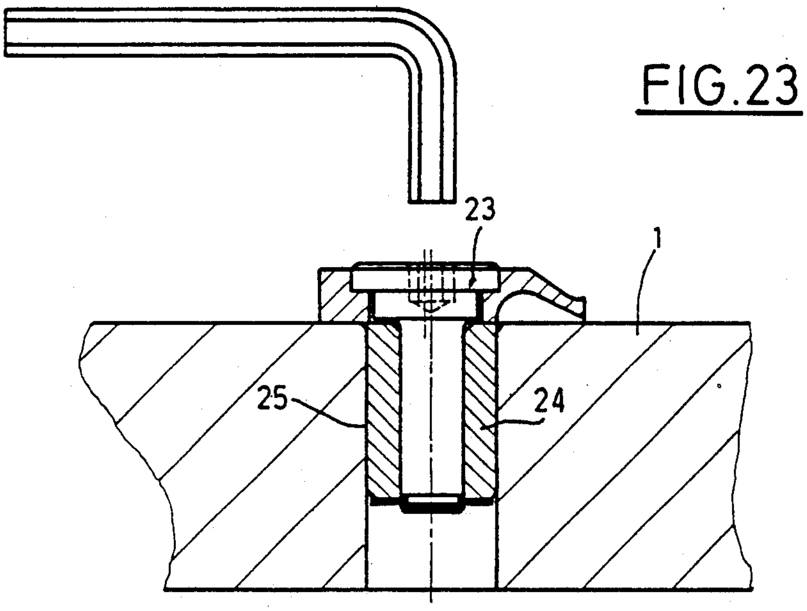
FIG. 23 is a partial side view in section of the bed-plate with the locking cramp of FIGS. 8 and 9.
Figure 24:
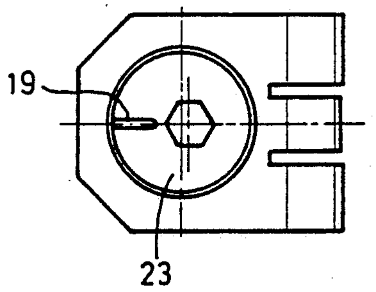
FIG. 24 is a plan view of the cramp of FIGS. 8, 9 and 23.

In each and every case there will be two abutments cramps 2 or 21 for stopping the part P relative to a reference plane, and locking-cramps, 16 which perform the lateral clamping of the part locking cramps such as that shown in FIG. 7, could also be substituted for the slider 3. Here, the cramp corresponding to that used on the slider of FIG. 5 includes a shaft with an eccentric head 23 ensuring the clamping of the part to be machined. This cramp is used in cooperation with a sleeve 24 (FIG. 9) which is accommodated in an orifice 25 in the bed-plate 1 as shown in FIG. 23. Alternatively, if the part P is to be clamped at another height, a sleeve 26 with a shoulder 27 may be used to receive the shaft with the eccentric head 23, as shown in FIG. 10.

Figure 20:
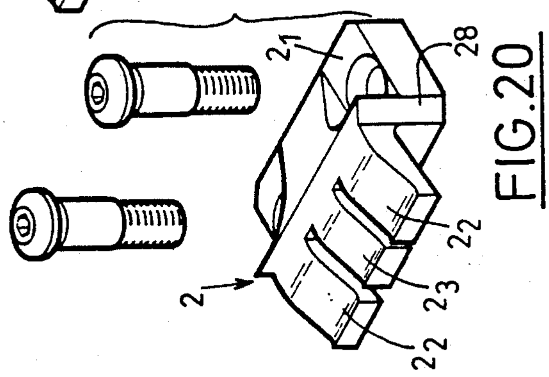
Figure 19:
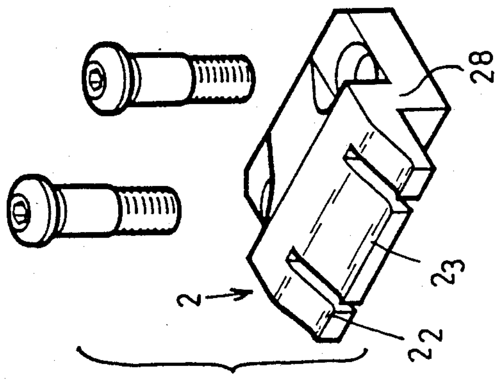

To obtain different clamp heights, as shown in FIGS. 19 and 20, abutment-cramps may be used which are of a generally Z-shape. In this case, the fixing face $2_1$ of the cramp 2 is at a different height from the clamp fingers $2_2$ and $2_3$ which are no longer in a single clamp plane but are raised by a step 28.

Figure 21:
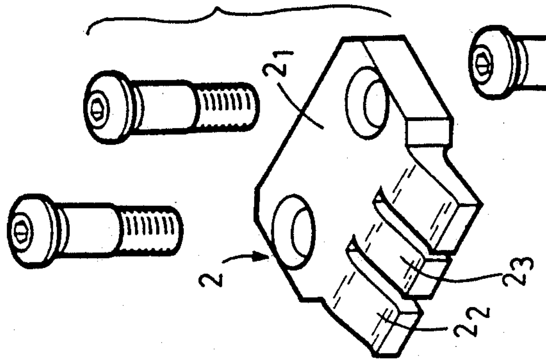
FIGS. 19 to 22 are perspective views showing respective embodiments of the cramps.
Figure 22:
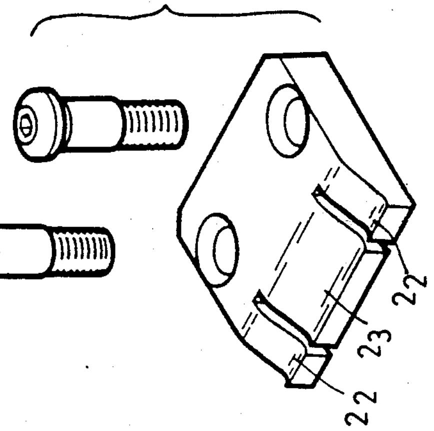

The fingers of the abutment cramps 2 may have shapes and dimensions different, such as is shown in FIGS. 21 and 22, where it will be noted that the fingers $2_2$ and $2_3$ have different dimensions and structures. In the case shown in FIG. 22, it is the outer fingers $2_2$ which are rigid and set back relative to the middle finger $2_3$ which, on the contrary, is elastically deformable, unlike the example in FIG. 21. In this case, the contact faces of the rigid abutments consisting of the middle finger $16_2$ of a cramp of a slider opposed to the two outer fingers $2_2$ of an abutment-cramp 2, define a triangular engagement on the part to be machined which is held between them, this geometry being accepted to be the most stable mechanically.

Figure 8:
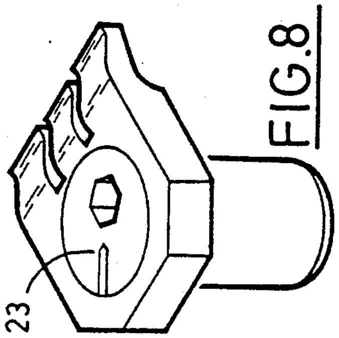
FIG. 8 is a perspective view of a locking cramp associated with a sleeve.

Thus, the securing of the parts P to be machined onto the bed-plate 1 is obtained, as indicated above, by the abutment cramps 2 on one hand and the locking sliders 3 on the other. In use, to achieve clamping of the parts P, as shown in FIG. 1, the first stage is to fix the abutment cramps 2, taking care to align them on the reference plane which the rear face 9 of the bed-plate 1 forms. At this stage, the parts P are brought into abutment on the projecting fingers of the abutment cramps 2 and then the sliders 3 are introduced into the T-grooves of the bed-plate 1, the bolts 14 having been carefully unscrewed first (FIG. 5). When the fingers 161 of the locking cramps 16 are in turn brought into contact with the part to be machined, the slider is secured in the groove 5 by turning the bolt 114 so that, as it screws into the base 12 of the slider, it pulls the base upwards until its side wings 121 engage the corresponding lips 51 of the grooves 5. The slider is now secured and it remains to clamp the part which corresponds to some extent to a fine adjustment, since the opposing cramps 2 and 16 are in contact with the two flanks 20 of the part P to be machined. This clamping is achieved by simple rotation of the eccentric head 17 of the shaft 18 which, as indicated above, urges the cramp 16 towards the part P to be machined, which also causes a firm and progressive engagement of the clamping fingers 161 against the flanks of the part to be machined until the fingers 161 are pressed back, arching to enable the middle finger 162 to abut in turn against the flank of the part. The part 20 is now fully secured by lateral clamping under the combined action of the fingers of the abutment-cramps 2 and the fingers of the locking cramps 16. The action would be identical if cramps with eccentrics as shown in FIGS. 8 and 10 with or without a raised shoulder were used.

As indicated above, series of cramps as shown in FIG. 1 may be used to clamp series of parts or to secure a single large-sized part.

When the part or parts have been clamped laterally, the bed-plate has then to be secured so as to avoid its movement or rotation under the force applied by the torque of the tool. To this end, various means may be employed, according to whether the machine has a table with a T-groove or tapped holes or whether the bed-plate is to be secured in the jaws of a vice or press.

These three fixing modes will be described hereinafter.

Figure 13:
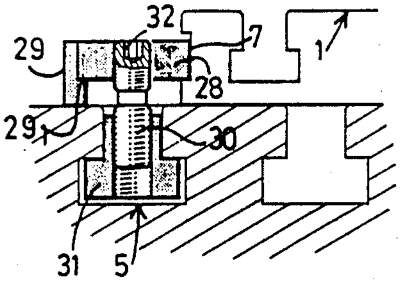

In the case where the bed-plate is to be secured onto a grooved table, such as is shown in FIG. 4, clamps 28 and clamp-supports 29 are used of the kind shown in FIG. 13, engaging the bed-plate laterally. Thus, as shown in FIG. 1, the bed-plate presents lateral grooves 6 and 7 with parallel sides for acting as seats engaged by one, side of each clamp 28, the opposite side of the clamp resting on a shoulder $29_1$ of the clamp support 29. A fixing stud-bolt 30,1 comparable to a nut and having a differential thread ensures the clamping of the bed-plate by screwing into a T-section brace 31 disposed within a groove 5 of the machine table 1. The dimensions of the brace 31 are entirely comparable with those of the groove 5 so that rotation of the stud-bolt 30 causes engagement of the two wings of the brace on the corresponding lips of the groove. The stud-bolt 30 has a hexagonal recess 32 to enable its rotation.

Figure 12:
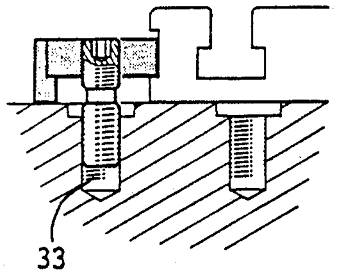
FIGS. 12 and 13 are part-sectional side views showing the fixing of the bed-plate onto a table of a machine-tool having threaded bores (FIG. 12) or T-grooves (FIG. 13)

In another embodiment of the invention, the bed plate is also secured using the principle described above, with the difference that the stud-bolt 30 does not screw into a brace 31 but screws directly into a tapped hole 33, as shown in FIG. 12.

Figure 14:
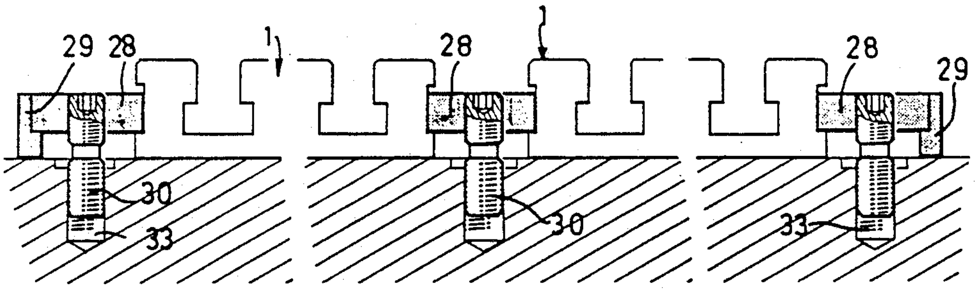
FIG. 14 is a part-sectional side view showing the fixing of two bed-plates on a table of a machine tool.

It is possible to clamp a plurality of bed-plates (FIG. 14) using a set of clamps 28 and stud-bolts 30 which screw into braces 31 or tapped holes 33, as desired. In the example shown in FIG. 14, the use of tapped fixing holes is the solution shown.

Figure 15:
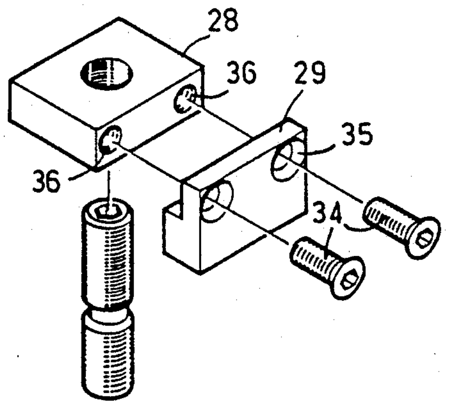
FIG. 15 is an exploded perspective view of a clamp and its clamp support.

The detail of the clamp 28 cooperating with its clamp support 29 is shown more clearly in FIG. 15, where the fixing bolts 34 used to connect these two components are shown. These bolts 34 pass through holes 35 formed in the upper part of the clamp support and are screwed into the thickness of the clamp 28 which presents tapped holes 36 for this purpose.

Figure 2:
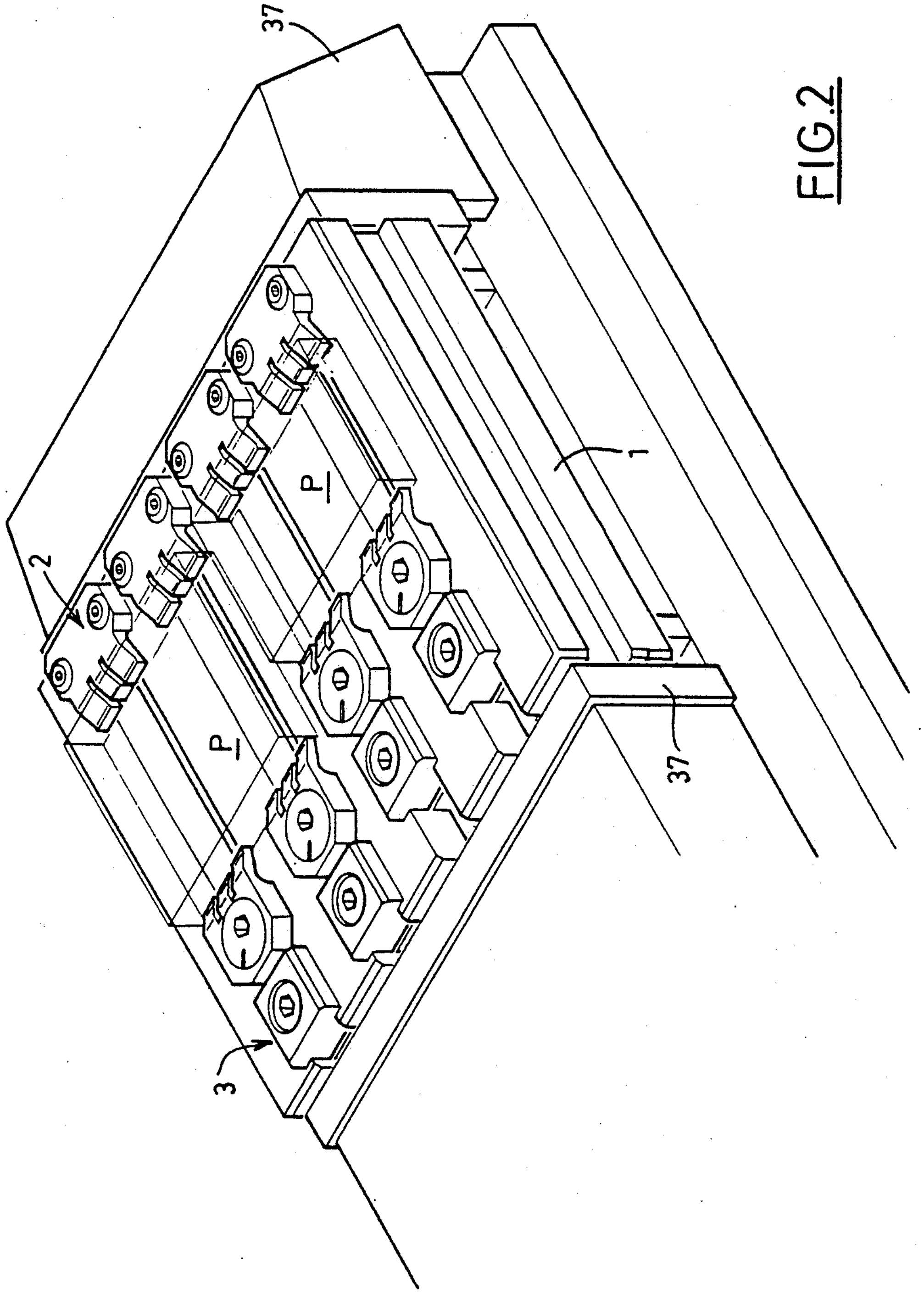
FIG. 2 is a perspective view of the same bed-plate fixed in the jaws or a vice of press.
Figure 16:
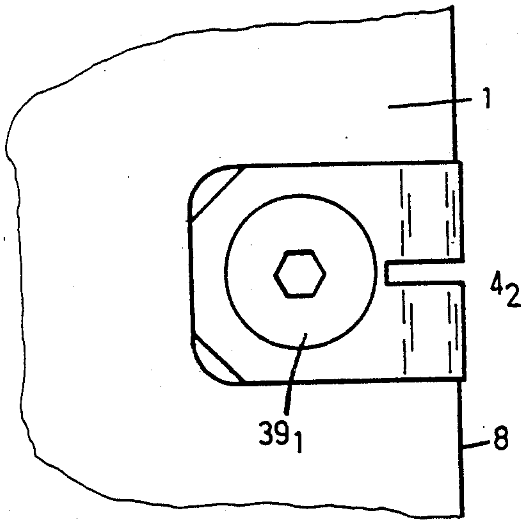
FIG. 16 is an underneath partial plan view of the bed-plate showing a bottom cramp for fixing the bed-plate.
Figure 17:
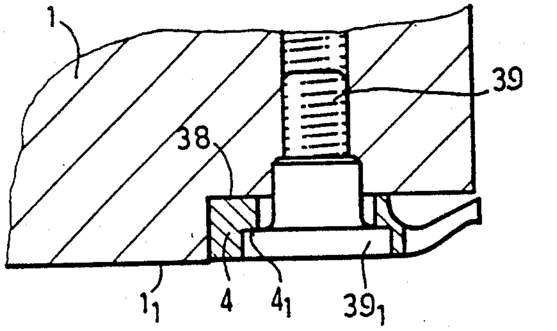
FIG. 17 is a partial side view in section of the bottom cramp under the bearing surface of the bed-plate.
Figure 18:
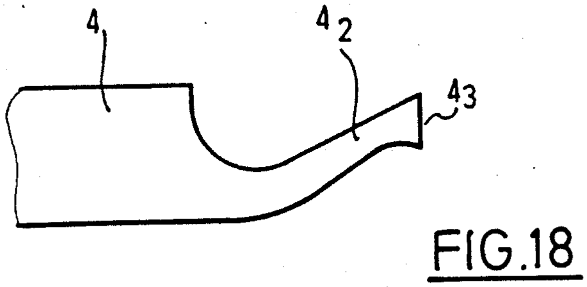
FIG. 18 is a partial side view showing a detail of a finger of the bottom cramp.

If the bed-plate 1 is to be held in the jaws of a mechanical or pneumatically-actuated vice (FIG. 2) a rigorous clamping of the bed-plate is obtained with the use of the lower cramps 4 (FIG. 1) of which the details is shown more particularly in FIGS. 16 to 18. The cramps 4 are fixed underneath the bearing surface 11 of the bed-plate in milled recesses 38, their fixing being obtained by a tightening bolt 39 whose head $39_1$ engages an annular shoulder 41 formed in the cramp 4. It will be noted that the cramp 4 presents two teeth $4_2$ which are elastically deformable, being relatively thin, the front ends $4_3$ of the fingers projecting slightly beyond the front face 8 of the bed-plate 1 (FIG. 16). It will be noted also that the fingers bend upwards, that is to say towards the upper face of the bed-plate so that, when the jaws of the vice are applied, the counter-reaction downwards produced by the bending of the fingers produces self application of the bed-plate.

I claim:

1. Clamping apparatus for clamping a part to be machined to a work station, comprising a bed-plate presenting a working surface, and parallel grooves of generally T-section in said working surface and at least one slider for cooperating with said grooves, said slider comprising a slider body including locking means for locking said slider body on said bed-plate, wherein said slider including a cramp presenting at least one elastically deformable finger, said cramp being mounted displaceably on said body, and eccentric means for displacing said cramp into engagement with a first side of the part to be machined, the apparatus also including at least one abutment for fixing relative to said bed-plate, said abutment comprising at least one cramp presenting at least one elastically deformable finger for engaging a second side of the part to be machined opposite to said first side, whereby to clamp said part between said cramps on said bed plate, and fixing means for securing said bed-plate to said work station.

2. Clamping apparatus as claimed in claim 1, wherein said slider body comprises a first part of generally inverted-T-section complimentary to said grooves of said bed-plate for sliding in one of said grooves, said locking means including a second part of generally T-section for extending above said groove, and screw means for urging said first and second parts together whereby to lock said slider body relative to said bed-plate, and said cramp being mounted on said first part of said slider body by said eccentric means which includes a shaft and a head mounted eccentrically on said shaft.

3. Clamping apparatus as claimed in claim 2, wherein at least one of said cramps comprises two of said elastically deformable fingers and a third finger disposed between said two fingers, said third finger being relatively rigid and presenting an abutment face beyond which said two fingers project.

4. Clamping apparatus as claimed in claim 2, wherein said cramp of said slider presents an annular shoulder for cooperating with said eccentric head, said eccentric means presenting marking for indicating the positioning of the clamp stroke.

5. Clamping apparatus as claimed in claim 2, wherein said first part of said slider body presents a tapped hole in which engages said screw means.

6. Clamping apparatus as claimed in claim 4, wherein said eccentric means includes clip means disposed above a lower face of said slider body for engaging an end of said shaft remote from said head whereby to secure said shaft to said body.

7. Clamping apparatus as claimed in claim 1, wherein said cramp of said abutment comprises two of said elastically deformable fingers and a third relatively rigid finger disposed between said two fingers and presenting an abutment face beyond which said two fingers project.

8. Clamping apparatus as claimed in claim 7, wherein said fingers of said cramp of said abutment present engagement faces for engaging the part to be machined, said faces being parallel to a reference plane which is defined by a side face of said bed-plate, said abutment including two locating bolts for engaging tapped holes in said bed-plate whereby to secure said abutment to said bed-plate, the line joining the longitudinal axes of said locating bolts being parallel to said reference plane and to said engagement faces, whereby to ensure accuracy of the parallelism.

9. Clamping apparatus as claimed in claim 1, wherein at least one of said cramps comprises two relatively rigid fingers of lesser width and greater thickness than said elastically deformable finger and presenting abutment faces for engaging the part to be machined, said elastically deformable finger extending between said rigid fingers and projecting beyond said abutment faces.

10. Clamping apparatus as claimed in claim 1 wherein said cramp of said abutment is of generally Z-shape, said cramp including a fixing part and said fingers being raised relative to said fixing part.

11. Clamping apparatus as claimed in claim 1, wherein said slider body includes a sleeve of smooth or shouldered cylindrical shape.

12. Clamping apparatus as claimed in claim 1, wherein said abutment comprises a slider body for cooperating with said grooves of said bed-plate, said cramp being mounted on said slider body adjustably in angle, whereby to adapt to a part to be machined having non-parallel sides.

13. Clamping apparatus as claimed in claim 1, wherein said fixing means comprise at least one further cramp disposed in a recess presented by said bed-plate in a bearing face thereof, and a fixing bolt presenting a head, said further cramp presenting an annular shoulder for cooperating with said head, said bed-plate presenting a tapped hole in said recess for receiving said fixing bolt, whereby to secure said further cramp in said recess.

14. Clamping apparatus as claimed in claim 13, wherein said further cramp presents at least one elastically deformable finger projecting beyond an edge of said recess and bending upwards towards said working surface of the bed-plate whereby said bed-plate is pressed down against said work station when pressed therein horizontally.

15. Clamping apparatus as claimed in claim 1, wherein said fixing means comprises at least one clamp. said bed-plate presenting lateral grooves for engagement by said clamp, a clamp support presenting a seat for supporting an end portion of said clamp remote from said lateral groove and screw means for securing said clamp and clamp support to a screw feature in said work station.

16. Clamping apparatus as claimed in claim 15, wherein said clamp presents an orifice, said screw means including at least one screw having a recessed head and a differential thread for engaging in said orifice and said screw feature.

17. Clamping apparatus as claimed in claim 1, wherein said slider body comprises a first part of generally inverted T-section complementary to said grooves for sliding in one of said grooves, said locking means including a second part of generally T-section for extending above said groove, screw means for urging said first and second parts together whereby to lock said slider body relative, to said bed-plate, and centering means for guiding relative movement of said first and second parts, said second part projecting beyond said first part longitudinally of said groove and bearing said cramp of said slider projecting further from said first part to overhang said groove.

18. Clamping apparatus as claimed in claim 1, wherein said cramp is coupled to said second part by a shaft with or without said eccentric means.

19. Clamping apparatus as claimed in claim 7 wherein said abutment face of said one rigid finger between two deformable fingers is disposed opposite said abutment faces of said two rigid fingers whereby to define a triangular engagement with the part to be machined positioned therebetween.

20. Clamping apparatus as claimed in claim 7, wherein said cramp of said abutment is of generally Z-shape, said cramp including a fixing part and said fingers being raised relative to said fixing part.

21. Clamping apparatus as claimed in claim 9 wherein said abutment face of said one rigid finger between two deformable fingers is disposed opposite said abutment faces of said two rigid fingers whereby to define a triangular engagement with the part to be machined positioned therebetween.

* * * * *